Figure 1:
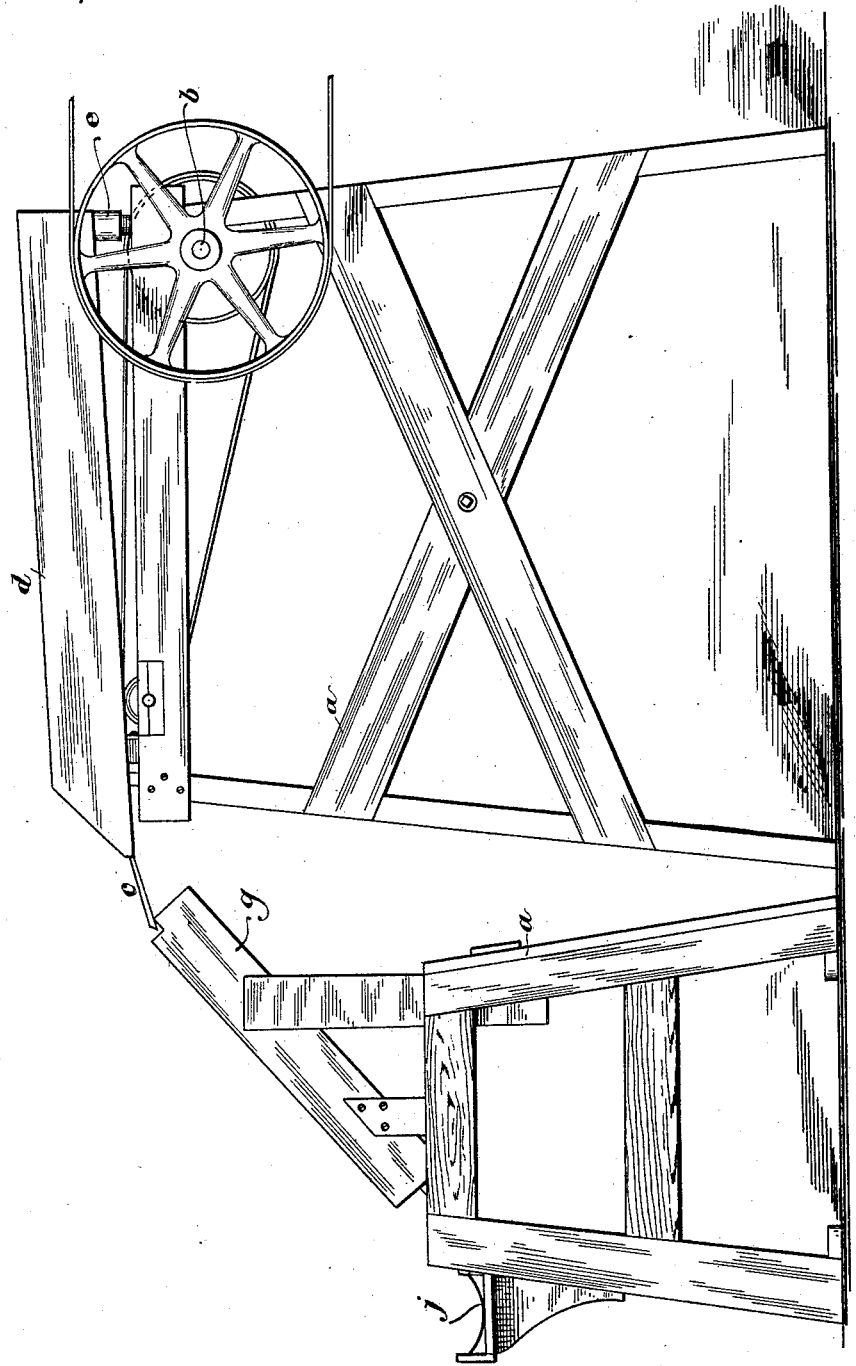

(No Model.) 2 Sheets—Sheet 1.

Z. M. LANE.
MACHINE FOR ARRANGING SHOE BLANKS.

No. 338,277. Patented Mar. 23, 1886.

Witnesses:
Chas. S. Gooding.
J. W. Redmond

Inventor:
Zenas M. Lane
by Chas. J. Andrew
Atty.

(No Model.) 2 Sheets—Sheet 2.
Z. M. LANE.
MACHINE FOR ARRANGING SHOE BLANKS.
No. 338,277. Patented Mar. 23, 1886.
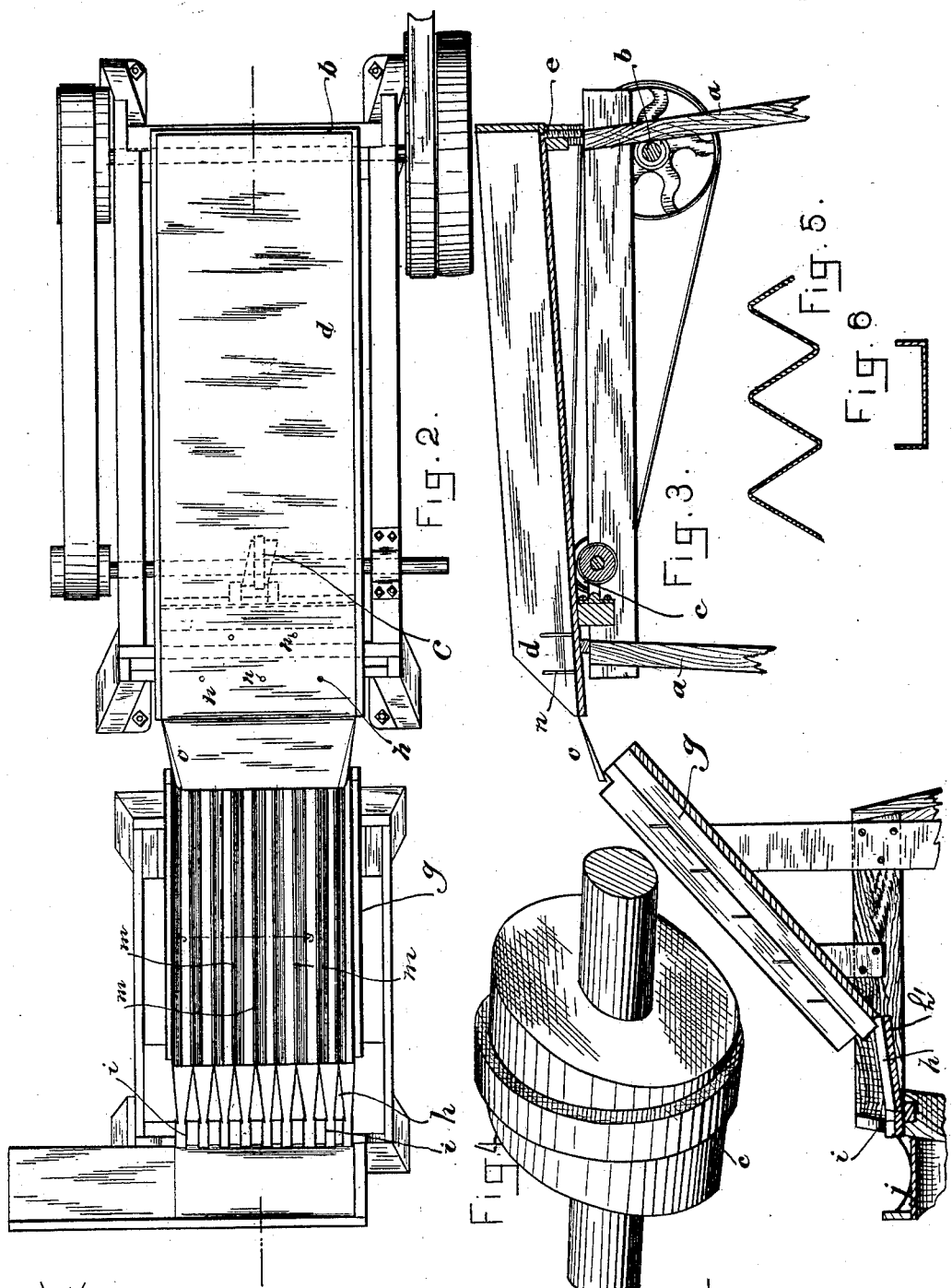
WITNESSES:
Chas. S. Gooding
J. W. Redmond
INVENTOR:
Zenas M. Lane
by Chas. Hedrew
Atty.

United States Patent Office.

ZENAS M. LANE, OF ROCKLAND, MASSACHUSETTS.

MACHINE FOR ARRANGING SHOE-BLANKS.

SPECIFICATION forming part of Letters Patent No. 338,277, dated March 23, 1886.

Application filed July 24, 1885. Serial No. 172,509. (No model.)

*To all whom it may concern:*

Be it known that I, ZENAS M. LANE, a citizen of the United States, residing at Rockland, in the county of Plymouth and State of Massachusetts, have invented certain new and useful Improvements in Machines for Arranging Shoe-Shanks; and I do hereby declare that the following is a full, clear, and exact description of the invention, which will enable others skilled in the art to which it appertains to make and use the same.

The object of my invention is the regular arrangement of metal shoe-shanks after they have been formed in a suitable machine or by suitable dies, and is intended as an attachment to any machine having for its function forming of metal blanks into shoe-shanks, or it may be used separately, the blanks being taken from such a machine and poured into a hopper prepared in my device for their reception. I accomplish my object by so arranging an inclined table, having its surface composed of a series of V-shaped longitudinal grooves, with relation to a hopper, as that the shanks proceeding from the hopper upon the table will there arrange themselves upon their edges and pass thence regularly upon a second inclined table having upon it grooves or troughs of such shape as that the blanks being caused to turn with their concave sides up will pass thence upon a stationary table, where they are finally arranged, resting on their convex sides, and are to be removed by the hand of an operator.

In the drawings I have shown, in Figure 1, an elevation of my device separated from the forming-machine to which it may be attached; in Fig. 2, a plan of same; in Fig. 3, a longitudinal section of the same; in Fig. 4, an enlarged view of cam *c;* in Fig. 5, a cross-section, enlarged, of three of the V-shaped grooves or troughs on the table *g*, and in Fig. 6 an enlarged sectional view of one of the grooves or troughs *i i*, through which the shanks pass from the grooves *h h*.

*a* is the frame of the machine.

*b* is the shaft from which motion is imparted to the cam *c*, attached to the undermost side of the hopper *d*, and imparting to it a slight motion from side to side, the hopper moving upon a pin, *e*.

*o* is a bridge to connect the hopper *d* with the table *g*. This bridge may in some cases be dispensed with and the shanks be permitted to pass directly from the hopper *d* to the table *g*.

*g* is a table, having its surface composed of a longitudinal series of V-shaped grooves or troughs, and placed at such inclination that the shanks will proceed readily by gravity along the troughs.

*h'* is a table, also inclined, but less so than the table *g*, having its surface divided into grooves or troughs, which at the end toward the table *g* are about the width of the upper part of the V-shaped troughs on the table *g*, and which taper at their other extremities to about one-half that width.

On the lower end of the hopper *d* are the pins *n n*, and on the table *g* are the pins *m m*, arranged as shown in Fig. 2.

*i i* are troughs with parallel sides, one of which is shown in section in Fig. 6.

*j* is a table, which may have a concaved surface or flat.

The operation of my device is as follows: The blanks pass from a forming-machine, or are thrown, as the case may be, into the hopper *d*, and by means of the sidewise motion given to it, as above explained, the blanks pass thence upon the table with the V-shaped troughs, where they necessarily lie lengthwise within the troughs and partly on their edges. The pins *n n* are intended to prevent the blanks from passing down too rapidly. The pins *m m* are intended, in case any blanks should accidentally be thrown crosswise on the V-shaped troughs, to compel them to turn and fall into the troughs. The blanks slide down the V-shaped troughs by gravity. After leaving the troughs they pass into the troughs *h h*. As soon as the shank is entirely in one of these troughs it is compelled to leave the position which it before had on one of its edges, or nearly so, and fall over onto its convex side. This results from the shank being brought so as to rest only on its ends when it reaches the trough *h*, it not being supported along its whole length, but only at its ends. In such position it necessarily falls over, as stated. Thence the shank passes through the troughs or the spaces *i i* to the table *j* with its concave side up. In this position the hand of the operator can readily remove them in successive batches.

What I claim, and desire to secure by Letters Patent, is—

1. In a machine for forming shoe-shanks, the hopper $d$, the V-shaped troughs $g\,g$, the troughs $h\,h$, the troughs $i\,i$, and the table $j$, in combination, substantially as and for the purpose above stated.

2. In a machine for forming shoe-shanks, the V-shaped troughs $g\,g$, the tapering troughs $h\,h$, and the table $j$, substantially as and for the purpose above stated.

3. The V-shaped troughs $g\,g$, the tapering troughs $h\,h$, the troughs $i\,i$, and the table $j$, in combination, substantially as and for the purpose above stated.

ZENAS M. LANE.

Witnesses:
 CHAS. F. PERKINS,
 ANSON M. LYMAN.